(12) United States Patent
Mahrenholz et al.

(10) Patent No.: US 10,443,628 B2
(45) Date of Patent: Oct. 15, 2019

(54) BOOM CONTROL WITH INTEGRATED VARIABLE RETURN METERING

(71) Applicant: Deere & Company, Moline, IL (US)

(72) Inventors: John R. Mahrenholz, Peosta, IA (US); Calin Raszga, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 192 days.

(21) Appl. No.: 15/334,849

(22) Filed: Oct. 26, 2016

(65) Prior Publication Data
US 2018/0112684 A1 Apr. 26, 2018

(51) Int. Cl.
| | |
|---|---|
| *F15B 11/08* | (2006.01) |
| *F15B 1/26* | (2006.01) |
| *F15B 13/04* | (2006.01) |
| *F15B 11/16* | (2006.01) |
| *A01G 23/081* | (2006.01) |

(52) U.S. Cl.
CPC ............... *F15B 11/08* (2013.01); *F15B 1/26* (2013.01); *F15B 11/16* (2013.01); *F15B 13/0402* (2013.01); *A01G 23/081* (2013.01); *F15B 2013/0412* (2013.01); *F15B 2211/20546* (2013.01); *F15B 2211/3058* (2013.01); *F15B 2211/3059* (2013.01); *F15B 2211/30535* (2013.01); *F15B 2211/30595* (2013.01); *F15B 2211/41554* (2013.01); *F15B 2211/7052* (2013.01); *F15B 2211/7128* (2013.01); *F15B 2211/7142* (2013.01)

(58) Field of Classification Search
CPC ........ F15B 11/024; F15B 13/06; F15B 13/07; F15B 21/14

USPC .................................................. 91/520, 531
See application file for complete search history.

(56) References Cited

U.S. PATENT DOCUMENTS

| | | | |
|---|---|---|---|
| 6,502,393 B1* | 1/2003 | Stephenson | F15B 11/006 60/414 |
| 6,557,453 B2 | 5/2003 | Paakkunainen et al. | |
| 7,008,168 B2* | 3/2006 | Bernhardt | A01B 63/1006 172/272 |
| 7,472,546 B2 | 1/2009 | Anderson | |
| (Continued) | | | |

OTHER PUBLICATIONS

Eaton Corporation, "Valvistor Proportional Flow Control—Cartridge Valves," brochure (2009) 16 pages, USA.

*Primary Examiner* — F Daniel Lopez
*Assistant Examiner* — Matthew Wiblin
(74) *Attorney, Agent, or Firm* — Michael Best & Friedrich LLP

(57) ABSTRACT

A hydraulic boom control system for a forestry machine includes a pump for pressurizing a hydraulic fluid on a high pressure side, a reservoir for storing hydraulic fluid on a low pressure side, and a first hydraulic cylinder including a cap end and a rod end. The first hydraulic cylinder is configured to actuate the hoist of the boom. A second hydraulic cylinder includes a cap end and a rod end and is configured to actuate the stick of the boom. A first control valve is operable to control the first hydraulic cylinder. A second control valve is operable to control the second hydraulic cylinder. A variable return metering valve is fluidly connected to at least one of the first or second control valves. The variable return metering valve is operable to modulate shared hydraulic fluid flow between the first hydraulic cylinder and the second hydraulic cylinder.

7 Claims, 10 Drawing Sheets

(56) References Cited

U.S. PATENT DOCUMENTS

| | | | |
|---|---|---|---|
| 8,430,621 B2 | 4/2013 | Jantti | |
| 8,899,143 B2 * | 12/2014 | Ho | E02F 9/2214 |
| | | | 91/358 R |
| 2013/0126023 A1 * | 5/2013 | Huynh | F15B 21/14 |
| | | | 137/563 |

* cited by examiner

BOOM CONTROL WITH INTEGRATED VARIABLE RETURN METERING

BACKGROUND

The present disclosure relates to systems and methods for using forestry machines, in particular a forestry vehicle for felling trees. More specifically, the present disclosure relates to a hydraulic control circuit configured to control movement of a boom of the forestry vehicle.

SUMMARY

Tree felling is the process of downing individual trees. Tree felling can be performed by hand (i.e., using an axe, saw, chainsaw, or other handheld device) or with mechanical assistance (i.e., using one or more pieces of logging equipment). A tree feller-buncher is a motorized mechanical felling vehicle that carries an attachment that cuts and gathers one or more trees during the process of tree felling.

Typically, a tracked forestry machine includes a working tool at a distal end of a boom. The boom includes at least a hoist boom pivotally connected to a turntable attached to an undercarriage of the tracked forestry machine and a stick boom pivotally connected to the hoist boom. The boom components are actuated by a plurality of hydraulic cylinders to allow at least horizontal and vertical movement of the working tool. In some boom control circuits, a first spool valve controls hydraulic flow to rod ends of both cylinders and a second spool valve controls hydraulic flow to the rod and cap end of the hoist cylinder. In such systems, the cap end of the hoist cylinder is not directly actuated. As a result, flow between the cap ends of each hydraulic cylinder may be shared and controlled by a straightline valve, adding an additional level of complexity to the control system.

In one aspect, the disclosure provides a hydraulic boom control system for a forestry machine, the boom including a hoist and a stick. The hydraulic boom control system includes a pump for pressurizing a hydraulic fluid on a high pressure side of a hydraulic circuit, a reservoir for storing hydraulic fluid on a low pressure side of the hydraulic circuit, and a first hydraulic cylinder including a cap end and a rod end. The first hydraulic cylinder is configured to actuate the hoist. A second hydraulic cylinder includes a cap end and a rod end and is configured to actuate the stick. A first control valve is operable to control the first hydraulic cylinder. A second control valve is operable to control the second hydraulic cylinder. A variable return metering valve is fluidly connected to at least one of the first or second control valves. The variable return metering valve is operable to modulate shared hydraulic fluid flow between the first hydraulic cylinder and the second hydraulic cylinder.

In another aspect, the disclosure provides a hydraulic boom control circuit for a forestry machine, the boom including a hoist and a stick. The hydraulic boom control circuit includes a first hydraulic cylinder including a cap end and a rod end, the first hydraulic cylinder configured to actuate the hoist, and a second hydraulic cylinder including a cap end and a rod end, the second hydraulic cylinder configured to actuate the stick. The circuit includes no more than two three-position spool valves. The spool valves are in fluid communication with and operable to control the flow of fluid to and from the first and second hydraulic cylinders. The first hydraulic cylinder is independently controllable with respect to the second hydraulic cylinder.

In yet another aspect, the disclosure provides a boom control system for a forestry machine including a boom having a hoist and a stick, and a first hydraulic cylinder for controlling the hoist and a second hydraulic cylinder for controlling the stick. The boom control system is controllable by an operator to actuate the boom. The boom control system includes a processor, a memory, and a human-machine interface. The processor is configured to: receive a command signal from the human-machine interface; determine, based on the command signal, a flow condition of pressurized hydraulic fluid between the first and second hydraulic cylinders to produce a predetermined movement corresponding to the command signal; and actuate a variable return metering valve to produce the flow condition.

In yet another aspect, the disclosure provides a hydraulic boom control circuit for a forestry machine, with the boom including a hoist and a stick. The hydraulic boom control circuit includes a pump for pressurizing a hydraulic fluid on a high pressure side of the circuit and a reservoir for storing hydraulic fluid on a low pressure side of the circuit. A hydraulic cylinder includes a cap end and a rod end and is configured to actuate at least one of the hoist or the stick. A control valve is operable to control a flow of the hydraulic fluid to the hydraulic cylinder. A first variable return metering valve is in communication with the reservoir and a second variable return metering valve in communication with the high pressure side of the cylinder.

In yet another aspect, the disclosure provides a forestry machine controllable by an operator, the forestry machine including a boom including a hoist and a stick, a controller configured to receive an input from the operator for controlling movement of the hoist and the stick, and a hydraulic circuit. The hydraulic circuit includes a pump for pressurizing a hydraulic fluid, a reservoir for receiving a low pressure hydraulic fluid, and a hydraulic cylinder including a cap end and a rod end. The hydraulic cylinder is configured to actuate one of the hoist or the stick. A control valve is operable to control the hydraulic cylinder. The hydraulic circuit is configured for regeneration of the high pressure fluid either from the rod end to the cap end or from the cap end to the rod end. A pair of variable return metering valves are configured to apportion a flow of pressurized hydraulic fluid for the regeneration and to return a portion of the pressurized hydraulic fluid to the reservoir.

Other aspects will become apparent by consideration of the detailed description and accompanying drawings.

DETAILED DESCRIPTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

The term calculating (or calculate and calculated), as used herein, is used with reference to calculations performed by the disclosed system. The term includes calculating, determining, and estimating. Also, various aspects of the systems and methods herein are disclosed as being applied on or used in conjunction with tree feller-bunchers. As used herein and in the appended claims, the term "feller-buncher" encompasses tree fellers, feller-bunchers, harvesters, and any similar vehicle, machine or device adapted to cut, move or transport trees. The term "forestry machine" may also be used herein to encompass the above-mentioned vehicles, machines or devices. In some constructions, the systems and methods disclosed herein are particularly well-suited for application on or use in conjunction with equipment having one or more implements associated with tree felling, but may also be employed in other machines, without limitation, having segmented booms or similar structures.

Figure 1:
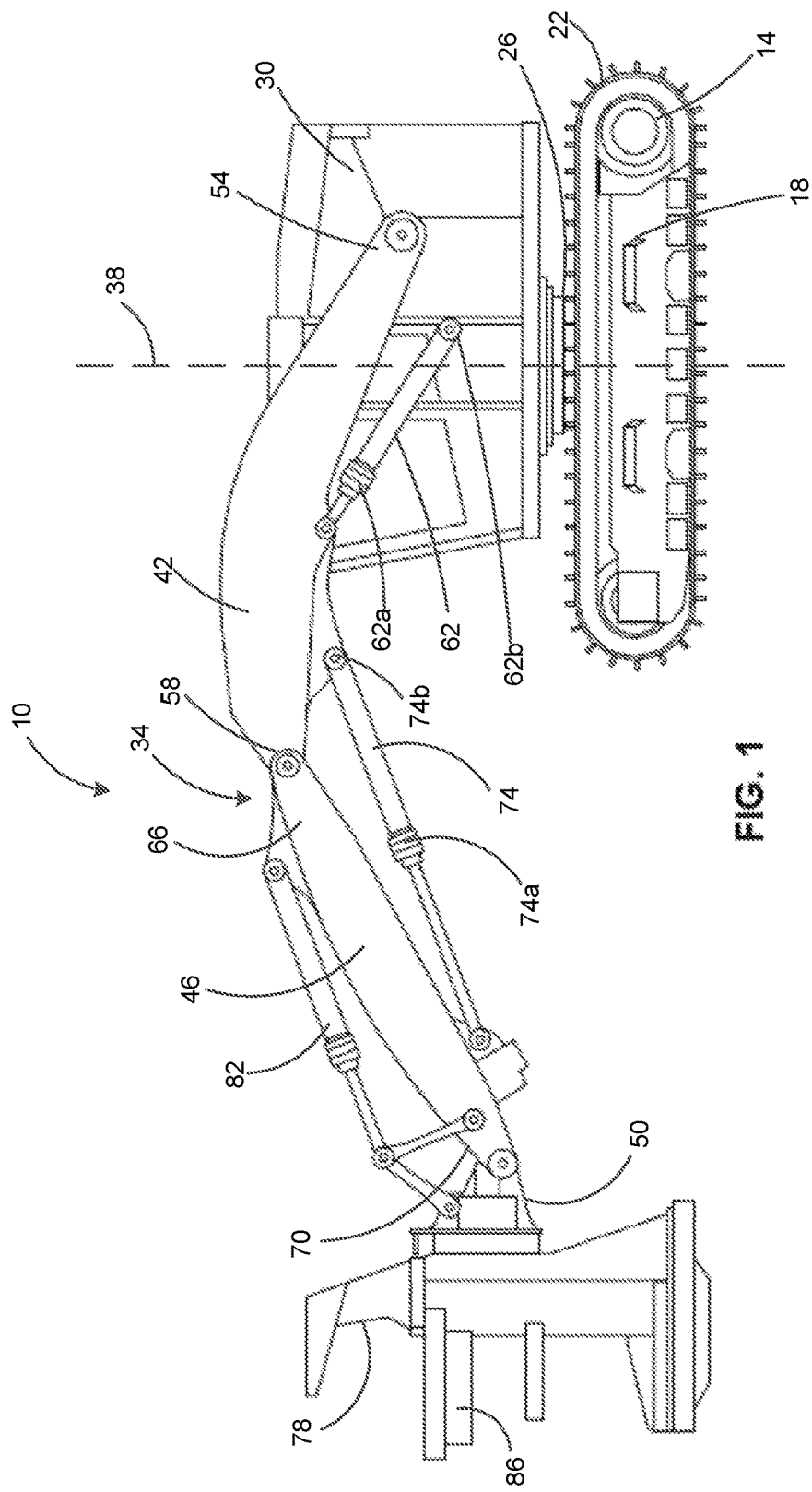
FIG. 1 is a perspective view of a non-leveling tracked tree feller-buncher according to some constructions of the present disclosure.

FIG. 1 illustrates a tree feller-buncher 10. The tree feller-buncher 10 may be a leveling or non-leveling feller-buncher. The tree feller-buncher 10 includes a plurality of drive wheels 14 connected to an undercarriage or frame 18 that rotate about corresponding axles (not shown). In some constructions, the drive wheels 14 may be drive tracks 22, as illustrated, or alternatively tires or other traction devices. The undercarriage 18 is attached to a turntable 26 presenting a face that carries a cab 30 and a boom 34. The turntable 26 rotates about an axis 38, allowing the turntable 26 (and attached cab 30 and boom 34) to rotate about, and independent of, the undercarriage 18. As shown in FIG. 1, the axis 38 is approximately perpendicular to the face of the turntable 26. In other constructions the axis 38 may be positioned at any suitable orientation to the turntable 26 and/or to one or more other components of the tree feller-buncher 10 to facilitate rotation of the turntable 26 about the undercarriage 18 (and the tracks 22). The turntable 26 rotates about the axis 38 three hundred and sixty degrees (360°). In other constructions the turntable 26 can rotate about the axis 38 less than three hundred and sixty degrees (360°). The cab 30 houses controls, including a control system that will be described in greater detail below, and an operator.

The tree feller-buncher 10 shown in FIG. 1 is non-leveling in that the orientation of the turntable 26 is dependent on the orientation of the undercarriage 18 and the tracks 22. Stated another way, the turntable 26 cannot be repositioned independent of the undercarriage 18 and the tracks 22, other than rotating with respect to the turntable as discussed above. Accordingly, the orientation of the turntable 26 (along with the attached cab 30 and the boom 34) is influenced by the ground or terrain encountered by the tracks 22.

The boom 34 is coupled to the turntable 26 (e.g., indirectly through the cab 30 or other vehicle frame structure) and includes a plurality of sub-booms that define an articulated arm. In the illustrated construction of FIG. 1, the boom 34 includes a hoist boom 42, a stick boom 46, and a wrist adapter 50. The hoist boom 42 has a first end 54 pivotably coupled to the turntable 26 and a second end 58 that may be moved up (in a direction away from the ground) and down (in a direction towards the ground) or forward (in a direction of movement away from the cab 30 and generally parallel to the ground) and backward (in a direction opposite the forward direction). The motion of the hoist boom 42 is actuated by at least one hoist hydraulic cylinder 62 (an optional second hydraulic cylinder (not shown), identical to hoist hydraulic cylinder 62, may be disposed in parallel with the hoist hydraulic cylinder 62). The hoist hydraulic cylinder 62 is a double-acting hydraulic cylinder and has a rod end 62a and a cap end 62b. The length, speed of movement, and direction of movement of the hoist hydraulic cylinder 62 may be controlled by a pressurized medium, such as hydraulic fluid.

A first end 66 of the stick boom 46 is pivotably connected to the second end 58 of the hoist boom 42. The stick boom 46 has a second end 70 that may be moved up and down or forward and backward, as previously described. The motion of the stick boom 46 is actuated by a stick hydraulic cylinder 74. The stick hydraulic cylinder 74 is a double-acting hydraulic cylinder and has a rod end 74a and a cap end 74b. The length, speed of movement, and direction of movement of the stick hydraulic cylinder 74 may also be controlled by a pressurized medium, such as hydraulic fluid.

The second end 70 of the stick boom 46 is pivotably connected to a felling head 78 coupled to the wrist adapter 50. The felling head 78 includes a plurality of arms 86 that pivot to grasp, retain, and release one or more trees during the felling and bunching process. The wrist adapter 50 facilitates both pivotable and rotational movement of the felling head 78 (e.g., about a horizontal axis and about a vertical axis with reference to the orientation of the wrist adapter 50 shown in FIG. 1, respectively) in relation to the stick boom 46. A wrist hydraulic cylinder 82 is disposed between the stick boom 46 and the wrist adapter 50, and additional hydraulic connections (not shown) facilitate movement of the felling head 78.

The operator of the feller-buncher controls the position of the felling head 78 by selectively controlling the movement of the boom 34 (using joystick control, etc.). For example, the operator can actuate the hoist boom 42 to move the felling head 78 in a vertical direction (e.g. up or down). The operator can actuate the stick boom 46 to move the felling head in a horizontal direction (e.g. towards or away from the cab 30). The hoist boom 42 and the stick boom 46 may be actuated simultaneously or may be actuated individually.

Figure 5:
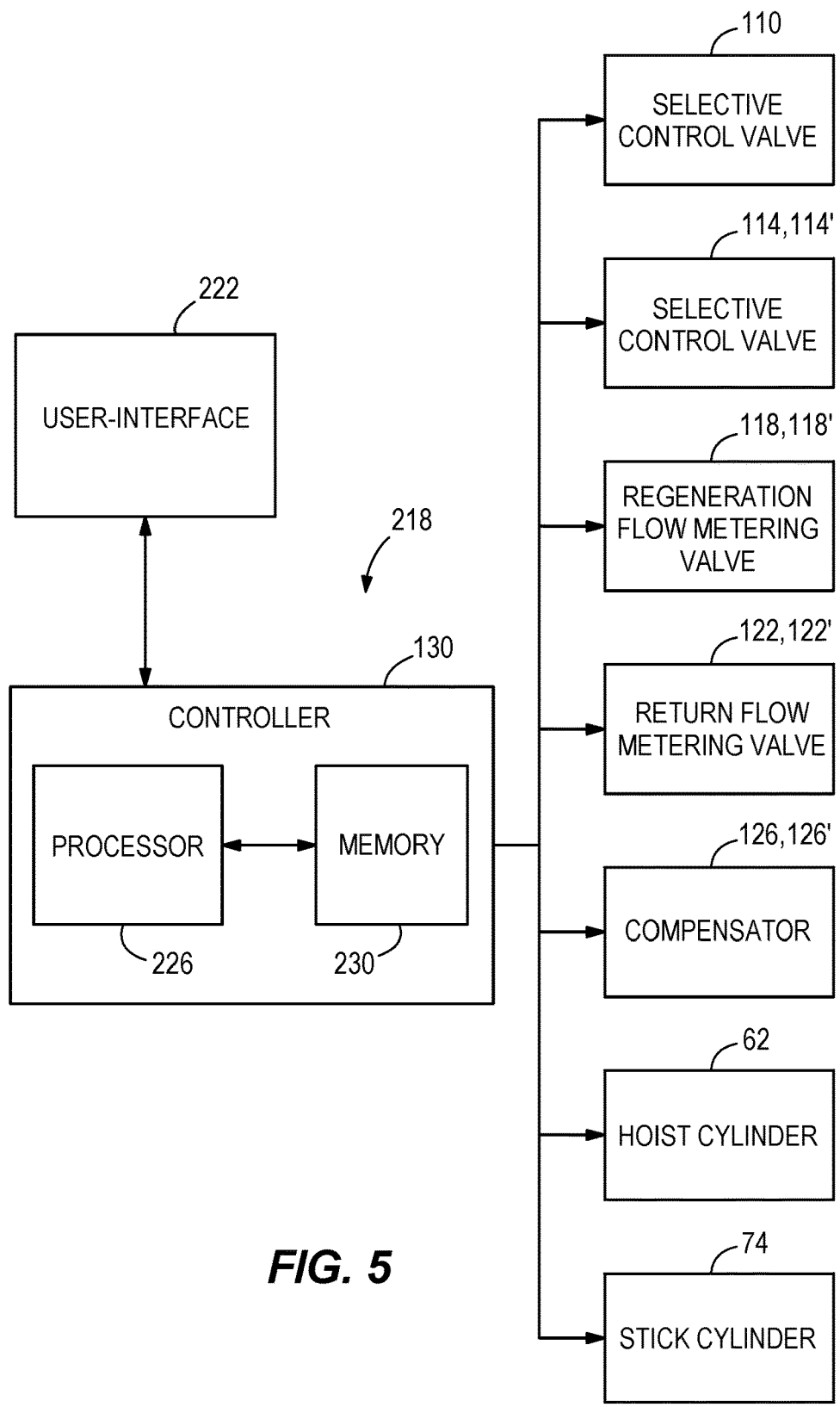
FIG. 5 is a schematic diagram of a control system used by the feller-buncher of FIG. 1.

The hoist boom 42 and the stick boom 46 are controlled via a hydraulic circuit containing and managing distribution of the hydraulic fluid. With reference to FIGS. 2A-2B and 3A-3B, the hydraulic control system or hydraulic circuit 90 of the present disclosure is illustrated as a closed loop system. In the illustrated construction, the hydraulic control system 90 is operable by hydraulic fluid; in other constructions, the control system 90 may be pneumatically operable. The hydraulic circuit 90 controls the movement of the hoist hydraulic cylinder 62 and the stick hydraulic cylinder 74. The hydraulic circuit 90 generally includes a hoist loop 94, a stick loop 98, a hydraulic reservoir 102 for storing low pressure hydraulic fluid, a hydraulic pump 106 for pressurizing hydraulic fluid, a circuit control valve 110 (FIG. 2A) that operably connects the hoist loop 94 to the stick loop 98, and a controller 130 (FIG. 5).

The arrangement of the components of the stick loop 98 is substantially similar to that of the hoist loop 94, so it will not be discussed in detail other than by specific reference to the description of the stick loop 98 below. Like parts will be given the same reference numbers, but parts in the stick loop 98 will be identified with an apostrophe ("'").

The hoist loop 94 includes a selective control valve 114, a regeneration flow metering valve 118, a return flow metering valve 122, and a compensator 126.

The selective control valve 114 is in the form of a three-position spool valve and includes three positions 114a, 114*b*, and 114*c*. The selective control valve 114 as illustrated is a double acting hydraulic actuated pilot valve with spring return and controlled by a control signal from the controller 130 in response to operator input to produce variable linear motion, but the illustrated valve is non-limiting for this application and other suitable control valves could alternatively be used. The valve 114 (and 114') is positionable from 0-100% of its possible range of motion. A first pilot 192 is actuated via a first solenoid operated valve 194 and a second pilot 198 is actuated via a second solenoid operated valve 202. As shown in FIGS. 2A-2B and 3A-3B, the hydraulic circuit 90 includes no more than two selective control valves 114 and 114'.

The regeneration flow metering valve 118 and the return flow metering valve 122 are termed variable control metering valves for purposes of this description. The regeneration flow metering valve 118 and the return flow metering valve 122 each include a housing, a valve body disposed within the housing, and a pilot valve fluidly connected to the housing. The housing defines an inlet, an outlet, an internal cavity, a pilot inlet, and a pilot outlet. The inlet, the outlet, and the pilot inlet are fluidly connected to the internal cavity. The internal cavity has a first portion configured to receive the valve body and a second portion that defines a variable volume between a top portion of the valve body and a top portion of the internal cavity. The valve body includes a longitudinal slot that receives a metering edge of the housing. The longitudinal slot and the metering edge form a variable orifice that selectively connects a valve inlet to the cavity. When the valve inlet is closed and the valve body is seated, the variable orifice is almost closed, leaving a small opening between the slot and the metering edge.

The pilot valve is a variable control valve that is positioned between the pilot inlet and the pilot outlet to selectively connect the variable volume portion of the internal cavity with the outlet defined by the housing. The pilot valve has a fully closed position in which flow between the pilot inlet and the pilot outlet is blocked and a fully open position in which flow between the pilot inlet and the pilot outlet is permitted. A solenoid is controlled by a variable current signal sent by the controller 130 to position the pilot valve in any possible position between fully closed and fully open (i.e., 0-100%).

When the inlet and the pilot valve are both closed, a pressure of the variable volume portion of the cavity is the same as a pressure at the inlet. An area of the upper cavity is greater than an area of the valve body that faces the inlet, so the valve body is held in position by a force proportional to the pressure differential between the inlet and the outlet. When the pilot valve is opened, the pressure in the variable volume portion of the internal cavity decreases, causing the valve body to move off of the seat. As the valve body moves off of the seat, the slot passes the metering edge, increasing the size of the orifice and allowing flow between the inlet and the outlet. The valve body moves upward until the pressure difference between the inlet and the outlet is zero and flow between the slot and the pilot valve are equal. Accordingly, a relatively small flow of fluid through the pilot valve is amplified by the valve body.

The flow of fluid through the inlet and the outlet holds the valve body in a steady-state position. If the flow through the pilot valve is reduced, the pressure in the variable volume portion increases, pushing the valve body downward, which reduces the size of the variable orifice and decreases flow through both the variable volume portion and between the inlet and the outlet defined in the housing. Thus, by controlling the flow through the pilot valve, the valve body can be in any position from fully closed to fully open. If the outlet pressure exceeds the inlet pressure when the two position pilot valve is closed, the valve body allows reverse flow.

The pilot valve includes a pressure compensated flow controller. When the pilot valve of the regeneration flow metering valve 118 or the return flow metering valve 122 includes a pressure compensated flow controller, the whole regeneration metering valve 118 or the whole return flow metering valve 122 is pressure compensated. The pressure compensated flow controller returns flow leaving the pilot valve to the outlet defined by the housing, meaning that the pilot valve does not require a drain connection. Therefore, the position of the valve body is controlled by a closed-loop system with a variable orifice in the valve body acting as the internal position feedback element. The command signal in this feedback element is the pilot flow, as determined by the pilot valve. The pressure-compensated flow controller valves allow consistent control of hydraulic fluid flow that is largely independent of pressure drop.

Figure 4:
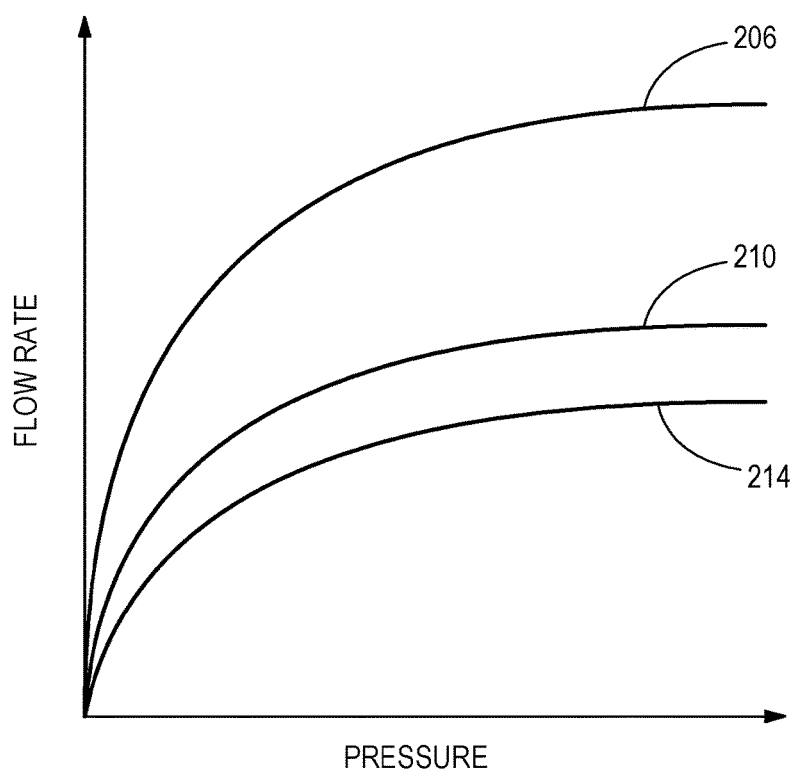
FIG. 4 is a pressure drop vs. flow rate graph for various solenoid current values applied to a flow metering valve.

The pilot valve is calibrated such that for a given command signal (e.g., electrical current) a flow rate through the valve is basically constant regardless of the accompanying pressure drop through the valve. Therefore, the magnitude of the command signal that is necessary to achieve a desired flow rate (or conversely maintain a relatively constant pressure drop) through the valve is known. Information regarding pressure drop vs. flow rate for various solenoid current values applied to the valves 118, 122 (which serves as calibration data for the pilot valve) is stored in the memory of the controller 130. An exemplary pressure drop vs. flow rate graph for different solenoid currents is shown in FIG. 4. Lines 206, 210, and 214 in FIG. 4 represent different magnitudes of solenoid current.

Referring again to FIGS. 2A-3B, a line, i.e., a line, pipe, or other form of conduit 134 connects the compensator 126 with the regeneration flow metering valve 118, a line 138 connects the regeneration flow metering valve 118 with the return flow metering valve 122, and a line 142 connects the return flow metering valve 122 to a drain line 146 and to the hydraulic reservoir 102. A line 150 with a restrictive component connects the line 138 to the drain line 146. A line 154 connects the line 138 with a first port of the selective control valve 114. A line 158 connects the line 134 with a second port of the selective control valve 114. A line 162 connects the line 154 with a third port of the selective control valve 114. The compensator 126 is connected to a high pressure line 166 through a line 170. A line 174 connects the rod end 62*a* of the hoist hydraulic cylinder 62 to a fourth port of the selective control valve 114, and a pressure sensor 178 is connected to the line 174 to sense a pressure of the rod end 62*a*. A line 182 connects the cap end 62*b* of the hoist hydraulic cylinder 62 to a fifth port of the selective control valve 114, and a pressure sensor 186 is connected to the line 182 to sense a pressure of the cap end 62*b*. A line 188 connects the compensator 126 to a relief valve 190.

Referring to FIG. 5, a control system 218 is configured to communicatively couple to various components of the feller-buncher 10 and may provide control and/or monitoring of the feller-buncher 10. The control system 218 includes the controller 130 and a user-interface 222. According to one or more exemplary constructions, the controller 130 includes a plurality of electrical and electronic components that provide power, operational control, and protection to the components and modules within the controller 130. For example, the controller 130 includes, among other things, an electronic processor 226 (e.g., a microprocessor, a microcontroller, or another suitable programmable device), a memory 230, and various input and output units.

The memory 230 includes, for example, a program storage area and a data storage area. The program storage area and the data storage area can include combinations of different types of memory 230, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 226 is connected to the memory 230 and executes software instructions that are capable of being stored in a RAM of the memory (e.g., during execution), a ROM of the memory (e.g., on a generally permanent basis), or another non-transitory computer readable medium such as another memory or a disc. Software included in the implementation of the hydraulic circuit 90 can be stored in the memory 230 of the controller 130. The software includes, for example, firmware, one or more applications, program data, filters, rules, one or more program modules, and other executable instructions. The controller 130 is configured to retrieve from memory 230 and execute, among other things, instructions related to the control processes and methods described herein. In other constructions, the controller 130 includes additional, fewer, or different components.

The user-interface 222 is used to control or monitor the feller-buncher 10. The user-interface 222 includes a combination of digital and analog input or output devices required to achieve a desired level of control and monitoring for the feller-buncher 10. For example, the user-interface 222 includes a display (e.g., a primary display, a secondary display, etc.) and input devices such as touch-screen displays, a joystick, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user-interface 222 can also be configured to display conditions or data associated with the feller-buncher 10 in real-time or substantially real-time. For example, the user-interface 222 is configured to display measured electrical characteristics of the feller-buncher 10 and the status of the feller-buncher 10. In some implementations, the user-interface 222 is controlled in conjunction with the one or more indicators (e.g., LEDs, speakers, etc.) to provide visual or auditory indications of the status or conditions of the hydraulic circuit 90. In the illustrated construction, the controller 130 may further be communicatively coupled to the hydraulic pump 106, the selective control valve 114, the regeneration flow metering valve 118, the return flow metering valve 122, the compensator 126, the hoist hydraulic cylinder 62 and the stick hydraulic cylinder 74.

Figure 6:
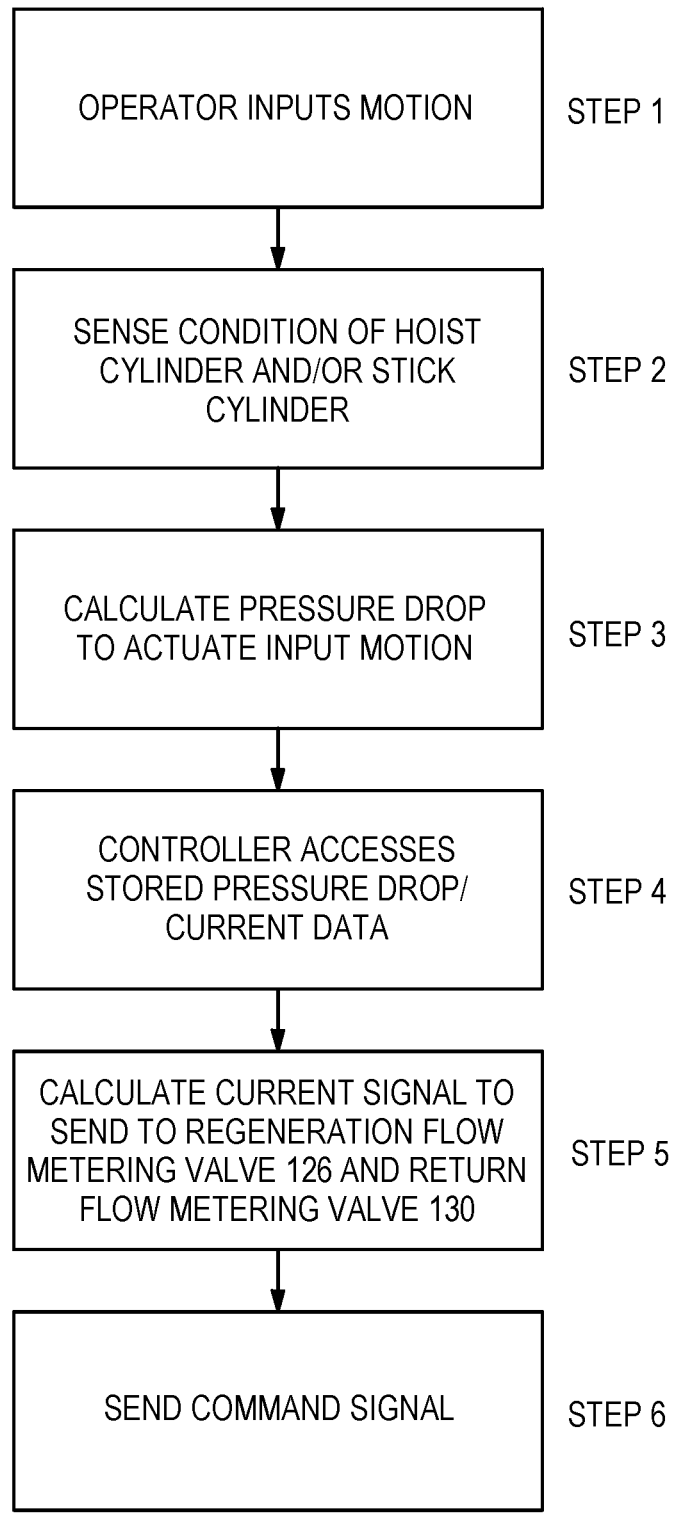
FIG. 6 is a flow diagram of a control process carried out by the control system of FIG. 4.

As shown in FIG. 6, in general operation when the operator inputs a desired position or movement of the boom 34 into the user-interface 222 (step 1), the controller 130 moves the selective control valve 114 into either of positions 114a, 114b, or 114c and senses a condition of the hoist hydraulic cylinder 62, the stick hydraulic cylinder 74, or both (step 2). The sensed condition may be a pressure (for example, the pressure of the rod ends 62a, 74a, or the pressure of the cap ends 62b, 74b), or a hydraulic fluid flow rate (e.g. rate of flow into or out of the rod ends 62a, 74a or the cap ends 62b, 74b). The controller 130 calculates or determines the flow condition (e.g. flow rate or pressure drop) required to produce the desired movement input by the operator based on the sensed condition (step 3). The controller 130 then accesses the pressure drop/flow rate/solenoid current calibration data stored in the memory 230 (step 4) to calculate the control signal in the form of an electrical current (e.g., a milliamp signal) needed to adjust the regeneration flow metering valve 118 and/or the return flow metering valve 122 into a position to produce the particular flow condition (e.g. the pressure drop or flow rate) (step 5). The controller 130 then commands a power source to send the calculated current to the solenoid of the regeneration flow metering valve 118 and/or the return flow metering valve 122 (step 6). In this embodiment, the control system 218 does not receive downstream information in the form of flow parameters to further adjust the control signal, thus the control system 218 does not function as a feedback loop control system.

Referring to the above description, the metering valves 118, 118', 122, 122' are each movable in an infinite number of positions within a predetermined range in response to a control signal sent by the controller 130. The current signal varies in magnitude, and the flow condition through the metering valves 118,118', 122, 122' is proportional to the current magnitude. Thus, the flow condition through the metering valves is controlled by way of the command signal.

For general operation of the system, when hydraulic fluid flows out of the cap ends 62b, 74b of the hydraulic cylinders 62, 74, the cap ends 62b, 74b have negative flow and are considered source cylinders. When hydraulic fluid flows into the cap ends 62b, 74b, the cap ends have positive flow and are considered receiver cylinders. When a product of the flow at the cap ends 62b, 74b is negative, regeneration between the hoist hydraulic cylinder 62 and stick hydraulic cylinder 74 is possible. Therefore, when one of the cap ends 62b, 74b is a source and the other of the cap ends 62b, 74b is a receiver, hydraulic fluid leaving the source cap end 62b, 74b may be reused by the other of the cap end 62b, 74b. When a product of the flow rate at the cap ends 62b, 74b of the hydraulic cylinders 62, 74 is positive, regeneration is not possible between the hoist hydraulic cylinder 62 and stick hydraulic cylinder 74 and the hydraulic circuit 90 is operated with the circuit control valve 110 closed. Operating the hydraulic circuit with the circuit control valve 110 closed, however, allows local regeneration to occur with the respective hydraulic cylinders 62, 74. Therefore, when both of the cap ends 62b, 74b are sources or receivers, hydraulic fluid is not shared between the cap ends 62b, 74b. Instead, the hydraulic fluid may be shared between the rod and cap ends of each individual hydraulic cylinder 62, 74.

The operator may use the user-interface 222 to command the controller 130 to enter a Pin Advance Movement Control Mode. In such a mode, as shown in FIGS. 2A and 2B, the hoist hydraulic cylinder 62 is commanded to retract while the stick hydraulic cylinder 74 is commanded to extend and regeneration occurs between the hoist hydraulic cylinder 62 and the stick hydraulic cylinder 74.

The controller 130 commands the valve 202 to shift the selective control valve 114 so that the position 114c of the selective control valve 114 is in communication with the hydraulic lines. The hydraulic pump 106 is therefore in fluid communication with the rod end 62a of the hoist hydraulic cylinder 62. The controller 130 commands the valve 194' to shift the selective control valve 114' so that the position 114a' is in communication with the hydraulic lines. The hydraulic pump 106 is therefore in fluid communication with the cap end 74b of the stick hydraulic cylinder 74.

The controller 130 senses a condition of the hoist hydraulic cylinder 62, and calculates the flow condition (e.g. pressure drop or flow rate) required to produce the commanded movement of the hoist hydraulic cylinder 62. The controller 130 likewise senses a condition of the stick hydraulic cylinder 74, and calculates the flow condition (e.g. pressure drop or flow rate) required to produce the commanded movement of the stick hydraulic cylinder 74. The controller 130 determines the magnitude of the control signal to send to the solenoid of the return flow metering valves 122, 122', as previously described, and sends the resultant signal to the valves 122, 122'. In this mode, the valve 122 is closed, while the valve 122' may vary from 0-100% of open as required. The controller 130 also commands the circuit control valve 110 to open so that the cap end 62b of the hoist hydraulic cylinder 62 is in fluid communication with the cap end 74b of the stick hydraulic cylinder 74.

Figure 2A:
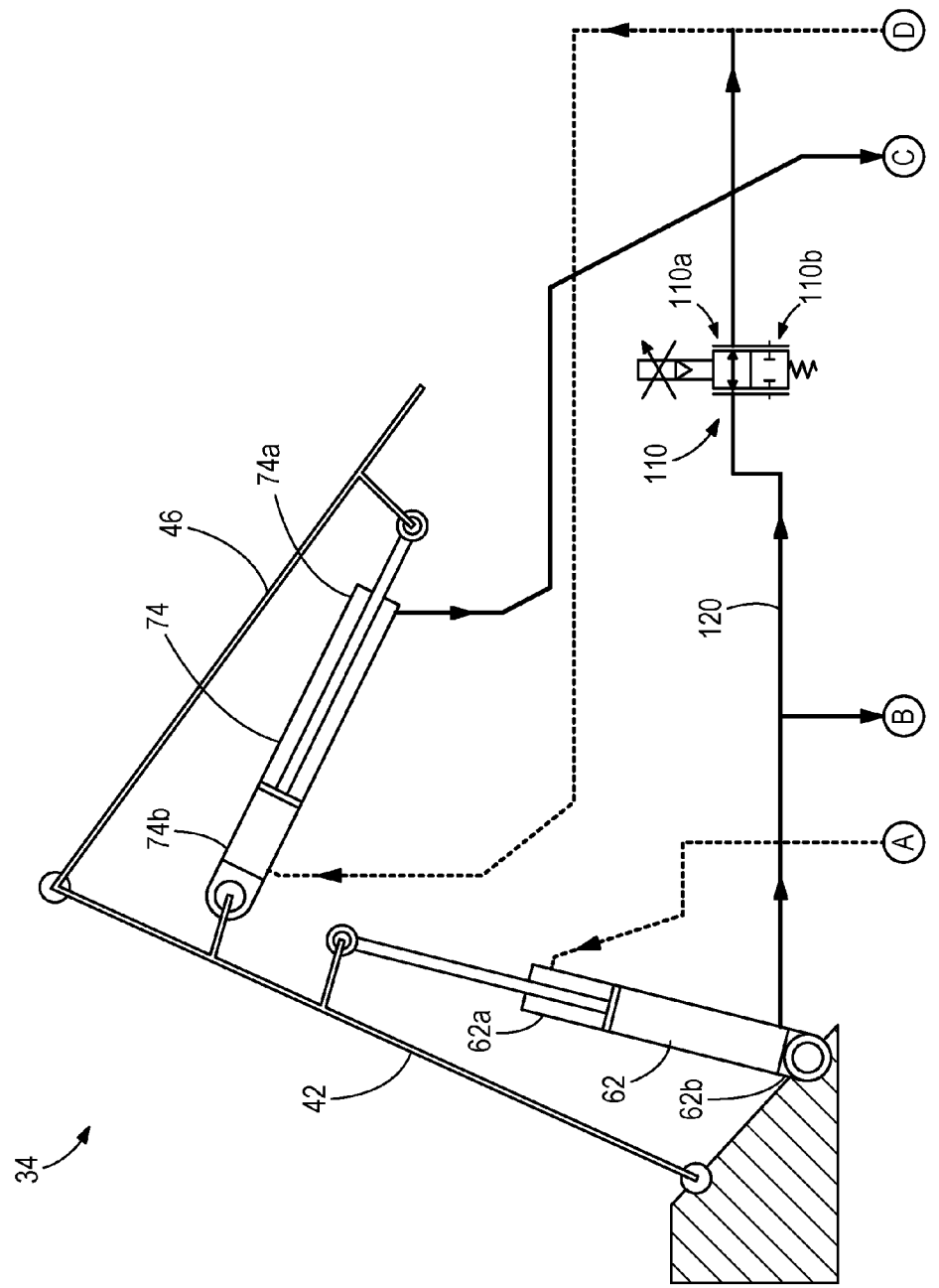
FIGS. 2A and 2B show a hydraulic control circuit used by the feller-buncher of FIG. 1 in a first mode.
Figure 2B:
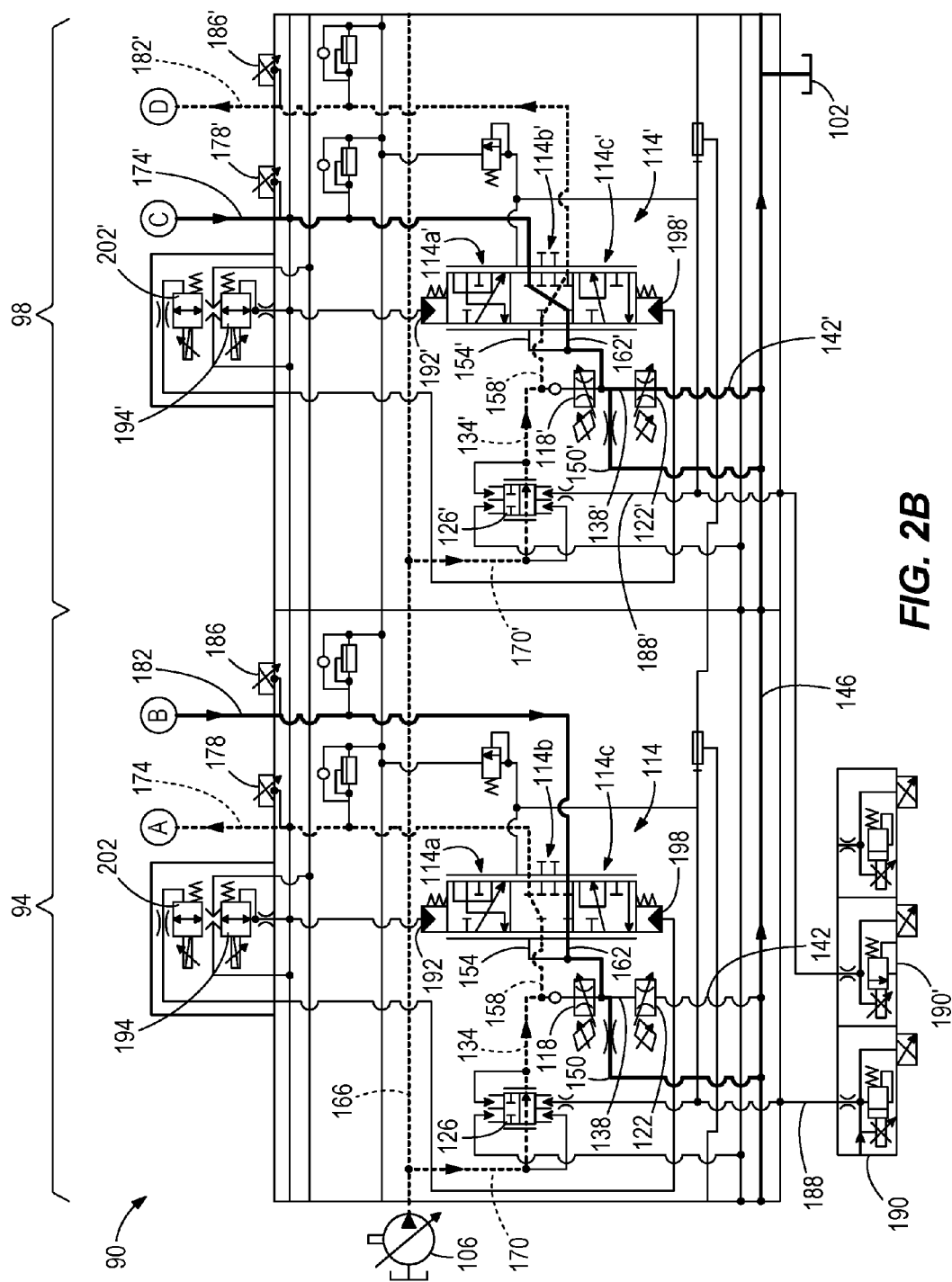

FIGS. 2A-2B illustrate the flow path of hydraulic fluid that occurs in the Pin Advance Movement Control Mode with the control valves 114, 114', 110 positioned as previously described. Hydraulic fluid flows from the high pressure line 166 through the compensator 126 and control valve 114 into the rod end 62a of the hoist hydraulic cylinder 62 through line 174. Hydraulic fluid flows out of the cap end 62b of the hoist hydraulic cylinder 62. A portion of the hydraulic fluid leaving the cap end 62b flows into the line 182 and another portion of the hydraulic fluid continues through the line 120. The portion of the fluid traveling within the line 182 passes through the selective control valve 114 and through the lines 162, 154, and 150 to the drain line 146 (and to the hydraulic reservoir 102). The portion of the hydraulic fluid passing through the line 120 continues through the circuit control valve 110 and into the line 182', where it joins hydraulic fluid passing from the high pressure line 166 through the compensator 126' and valve 114'. The combined flow travels through the line 182' to the cap end 74b of the stick hydraulic cylinder 74.

Concurrently, hydraulic fluid flows out of the rod end 74a of the stick hydraulic cylinder 74 into the line 174', through the selective control valve 114', the line 162', the line 154', and into the line 138', thereafter splitting to both the line 150' and the return flow metering valve 122'. The return flow metering valve 122' meters a portion of the flow into the hydraulic reservoir 102 via the line 142' and the drain line 146. As a result, the system modulates flow to the hydraulic reservoir 102 through the return flow metering valve 122 and thus the overall flow rate and volume returning to the low pressure source within the circuit 90.

Figure 3A:
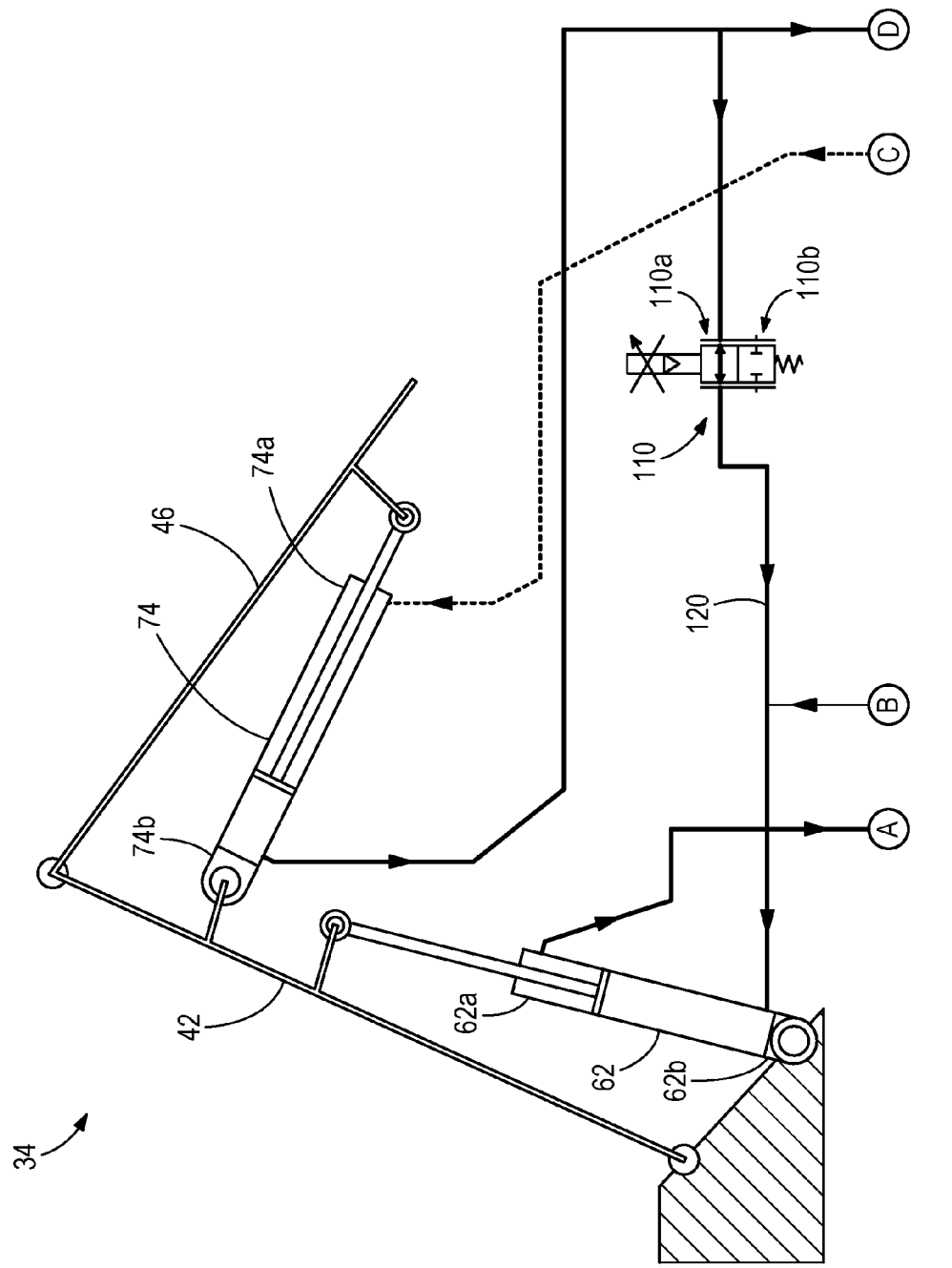
FIGS. 3A and 3B show the hydraulic control circuit used by the feller-buncher of FIG. 1 in a second mode.
Figure 3B:
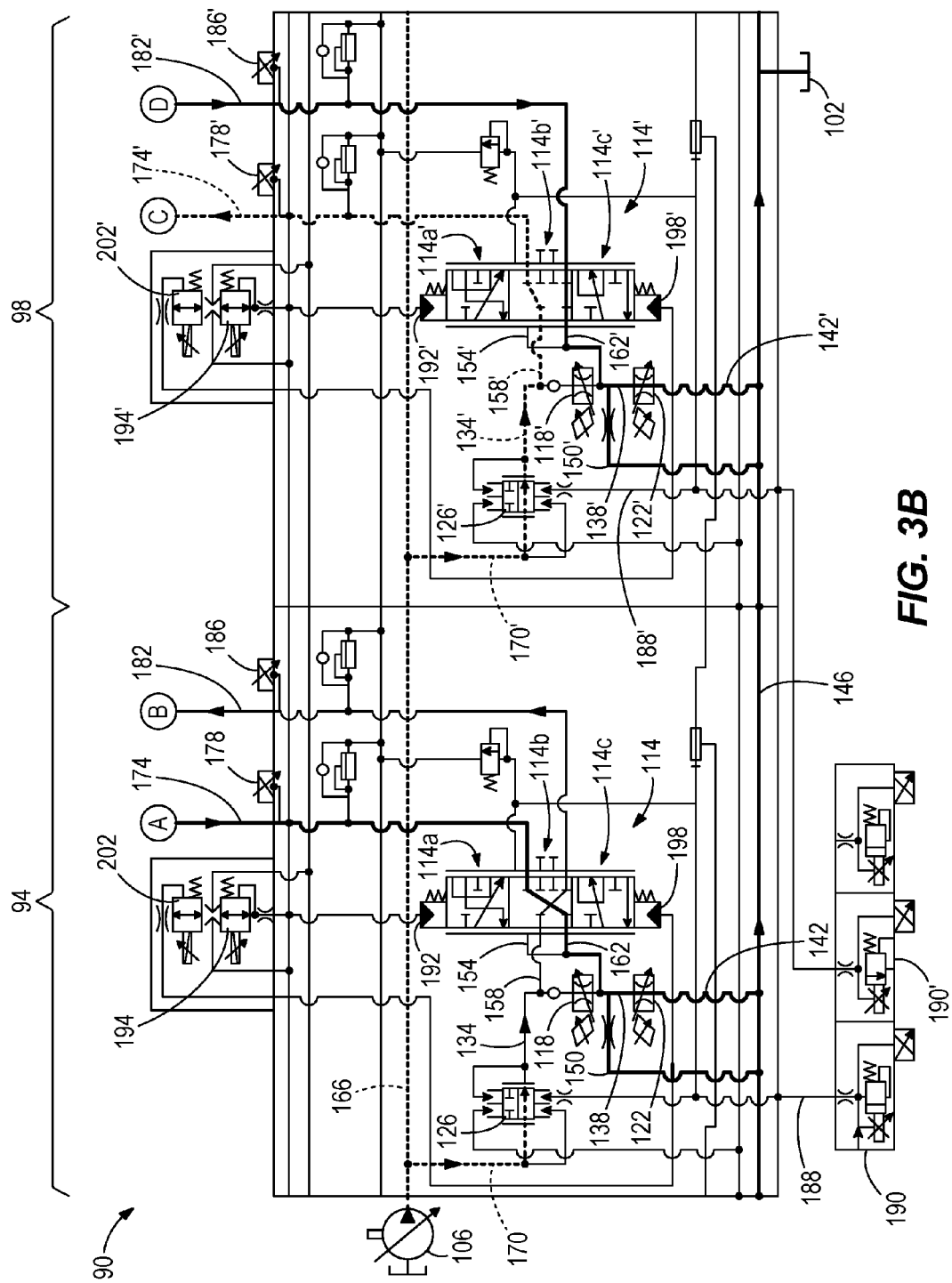

The operator may use the user-interface 222 to command the controller 130 to enter a Pin Retract Movement Control Mode. In such a mode, as shown in FIGS. 3A and 3B, the controller 130 commands the valve 194 to shift the selective control valve 114 so that the position 114a is in fluid communication with the hydraulic lines. The controller 130 commands the valve 202' to move the selective control valve 114' so that the position 114c' is in communication with the hydraulic lines.

The controller 130 senses a condition of the hoist hydraulic cylinder 62, and calculates the flow condition (e.g. pressure drop or flow rate) required to produce the commanded movement of the hoist hydraulic cylinder 62. The controller 130 likewise senses a condition of the stick hydraulic cylinder 74, and calculates the flow condition (e.g. pressure drop or flow rate) required to produce the commanded movement of the stick hydraulic cylinder 74. The controller 130 determines the amount of current to send to the solenoid of the return flow metering valves 122, 122' to produce the commanded movement, as previously described, and sends the resultant signal to the valves 122, 122'. In this mode both the valves 122, 122' may independently vary from 0-100% of open as required. The controller 130 commands the circuit control valve 110 to open so that the cap end 62b of the hoist hydraulic cylinder 62 is in fluid communication with the cap end 74b of the stick hydraulic cylinder 74.

FIGS. 3A-3B illustrate the flow path of hydraulic fluid that occurs in the Pin Retract Movement Control Mode with the control valves 114, 114', 110 positioned as previously described. The hydraulic fluid flows from the high pressure line 166 through the compensator 126' and valve 114' into the rod end 74a of the stick hydraulic cylinder 74. Hydraulic fluid concurrently flows out of the cap end 74b of the stick hydraulic cylinder 74. Hydraulic fluid leaving the cap end 74b of the stick hydraulic cylinder flows through the line 182' and divides such that a portion passes to the circuit control valve 110 and a portion continues through the valve 114', the lines 162', 154', and 138'. A first portion of the flow into line 138' passes through line 150' to the hydraulic reservoir 102 and a second portion enters the return flow metering valve 122', where it is metered before flowing to the hydraulic reservoir 102. The portion of fluid from the cap end 74b passing through the circuit control valve 110 and line 120 flows into the cap end 62b of the hoist hydraulic cylinder 62 via the line 174.

With continued reference to FIGS. 3A-3B, hydraulic fluid flows out of the rod end 62a of the hoist hydraulic cylinder 62 and into the line 174, through the selective control valve 114, and the lines 162, 154, and 138. A first portion of hydraulic fluid flows through the line 150 to the hydraulic reservoir 102 and the return flow metering valve 122 meters a second portion of the incoming hydraulic fluid to the hydraulic reservoir 102. The relief valve 190 is actuated such that hydraulic fluid does not flow through the compensator 126.

As opposed to the above-described operations in which the regeneration flow metering valves 118, 118' were not modulated, when regenerative flow occurs at the level of either the hoist hydraulic cylinder 62 or the stick hydraulic cylinder 74, the controller 130 commands the regeneration flow metering valve 118 (and/or 118') to move to a calculated position to adjust the flow condition (e.g. pressure or flow rate) of incoming hydraulic fluid. For some movements, the flow metered by the regeneration flow metering valve 118 is mixed with hydraulic fluid flowing through the compensator 126 from the high pressure line 166 to flow again through the valve 114. A similar scheme applies to the stick hydraulic cylinder 74 and the regeneration flow metering valve 118' and is not discussed in detail.

Figure 7:
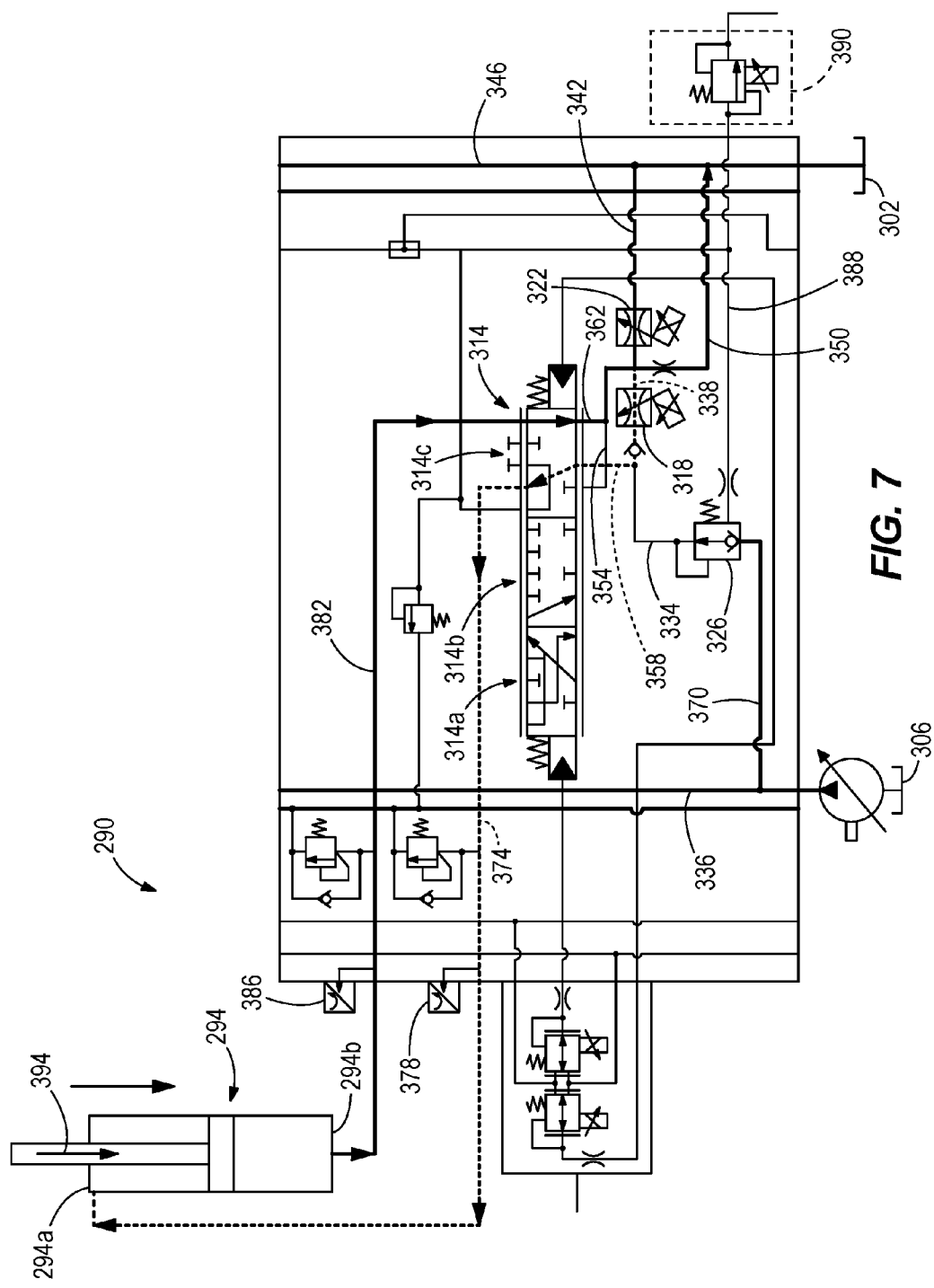
FIG. 7 illustrates a portion of a hydraulic control circuit used by the feller-buncher of FIG. 1.

FIG. 7 shows a hydraulic circuit 290 configured to actuate a hydraulic cylinder 294 including a rod end 294a and a cap end 294b. The hydraulic circuit 290 illustrated in FIG. 7 is a closed loop system with local regeneration. A control system operating on the same principles as the control system 218 described above includes the hydraulic circuit 290 and a controller 330. The controller 330 is substantially the same as the controller 130 described above.

The hydraulic circuit 290 includes a hydraulic reservoir 302, a hydraulic pump 306, a selective control valve 314, a regeneration flow metering valve 318, a return flow metering valve 322, and a compensator 326. The hydraulic reservoir 302, the hydraulic pump 306, the selective control valve 314, the regeneration flow metering valve 318, the return flow metering valve 322, and the compensator 326 are substantially the same as the hydraulic reservoir 102, the hydraulic pump 106, the selective control valve 114, the regeneration flow metering valve 118, the return flow metering valve 122, and the compensator 126 and will not be discussed in detail. Reference should be made to the descriptions above. Additionally, the hydraulic circuit 290 may represent one of the hydraulic circuits 94, 98 of circuit 90 when the circuit control valve 110 is closed and effectively isolates circuit 94 from circuit 98.

As shown in FIG. 7, the hydraulic circuit 290 includes a line, pipe, or other form of conduit 334 connecting the compensator 326 with the regeneration flow metering valve 318. A line 338 connects the regeneration flow metering valve 318 with the return flow metering valve 322 and a line 342 connects the return flow metering valve 322 to a drain line 346 and to the hydraulic reservoir 302. A line 350 with a restrictive component connects the line 338 to the drain line 346. A line 354 connects the line 338 with a first port of the selective control valve 314. A line 358 connects the line 334 and the regeneration flow metering valve 318 with a second port of the selective control valve 314. A line 362 connects the line 354 with a third port of the selective control valve 314. The compensator 326 is connected to a high pressure line 366 via a line 370. A line 374 connects the rod end 294*a* of the hydraulic cylinder 294 to a fourth port of the selective control valve 314. A pressure sensor 378 is connected to the line 374 to sense a pressure of the rod end 294*a* of the hydraulic cylinder 294. A line 382 connects the cap end 294*b* of the hydraulic cylinder 294 to a fifth port of the selective control valve 314. A pressure sensor 386 is connected to the line 382 to sense a pressure of the cap end 294*b* of the hydraulic cylinder 294. A line 388 connects the compensator 326 to a relief valve 390.

FIG. 7 illustrates the flow path of hydraulic fluid that occurs when the hydraulic cylinder 294 undergoes regenerative lowering. The controller 330 commands the selective control valve 314 to move to the position shown in FIG. 7, and the relief valve 390 is opened, ceasing or greatly reducing high pressure flow passing through the compensator 326. The controller 330 senses a pressure of the rod end 294*a* and the cap end 294*b* of the hydraulic cylinder 294. The controller 330 calculates or determines a flow condition (e.g. pressure drop or flow rate) necessary to move the hydraulic cylinder 294 as commanded. The controller 330 determines a magnitude of the control signal to send to the respective solenoids of the regeneration flow metering valve 318 and the return flow metering valve 322. In this mode, the regeneration flow metering valve 318 and the return flow metering valve 322 may each vary independently from 0-100% open as required.

Specifically, as shown in FIG. 7, a force 394 due to a weight of a boom associated with the hydraulic cylinder 294 causes hydraulic fluid to flow out of the cap end 294*b*. The hydraulic fluid travels through the line 382, through the selective control valve 314 to the lines 362 and 354. When the flow reaches the line 338, a first portion of the hydraulic fluid is metered through the regeneration flow metering valve 318 to the flow condition required by the rod end 294*a* of the cylinder. The hydraulic fluid metered by the regeneration flow metering valve 318 travels through the line 334 back through the selective control valve 314 into the line 374. The hydraulic fluid travels through the line 374 to the rod end 294*a* of the hydraulic cylinder 294. A second portion of the hydraulic fluid is metered through the return flow metering valve 322 to the line 342 and the drain line 346 to the hydraulic reservoir 302. A third portion of the hydraulic fluid flows from the line 338 through the line 350 to the hydraulic reservoir 302. Accordingly, lowering of the hydraulic cylinder 294 is accomplished solely by using regeneration and does not require the use of the hydraulic pump 306. If the force 394 changes direction, the control system commands the regeneration flow metering valve 318 to close and commands the return flow metering valve 322 to open and additionally adjusts the selective control valve 314 accordingly.

Figure 8:
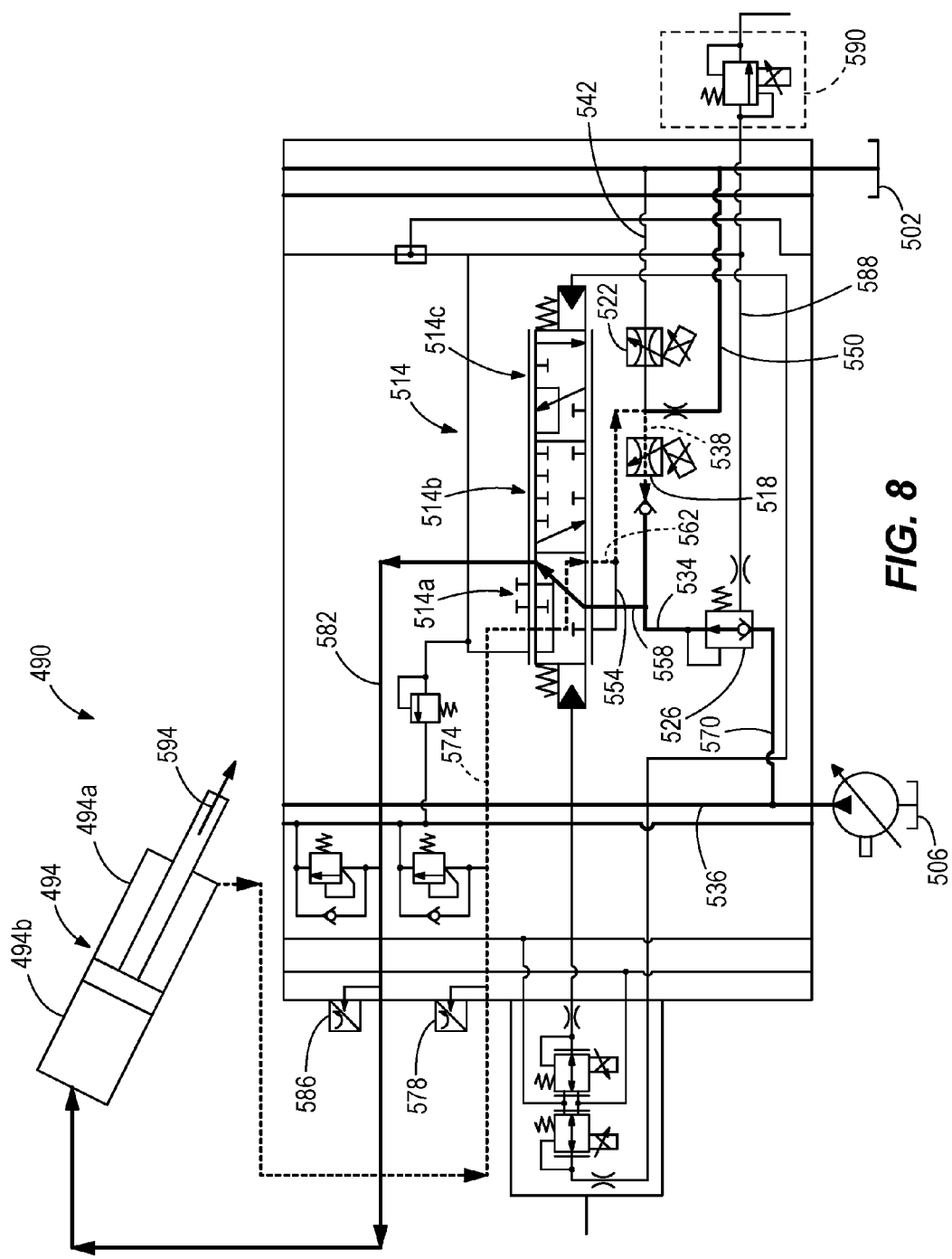
FIG. 8 illustrates another portion of a hydraulic control circuit used by the feller-buncher of FIG. 1.

FIG. 8 shows a hydraulic control system or hydraulic circuit 490 configured to actuate a hydraulic cylinder 494 including a rod end 494*a* and a cap end 494*b*. The hydraulic circuit 490 illustrated in FIG. 8 is a closed loop system with local regeneration. A control system operating on the same principles as the control system 218 described above includes the hydraulic circuit 490 and a controller 530. The controller 530 is substantially the same as the controller 130 described above.

The hydraulic circuit 490 includes a hydraulic reservoir 502, and a hydraulic pump 506, a selective control valve 514, a regeneration flow metering valve 518, a return flow metering valve 522, and a compensator 526. The hydraulic reservoir 502, the hydraulic pump 506, the selective control valve 514, the regeneration flow metering valve 518, the return flow metering valve 522, the compensator 526, and the controller 530 are substantially the same as the hydraulic reservoir 102, the hydraulic pump 106, the selective control valve 114, the regeneration flow metering valve 118, the return flow metering valve 122, the compensator 126, and the controller 330 and will not be discussed in detail. Reference should be made to the descriptions above. Additionally, the hydraulic circuit 490 may represent one of the hydraulic circuits 94, 98 of circuit 90 when the circuit control valve 110 is closed and effectively isolates circuit 94 from circuit 98.

As shown in FIG. 8, the hydraulic circuit 490 includes a line, pipe, or other form of conduit 534 that connects the compensator 526 with the regeneration flow metering valve 518. A line 538 connects the regeneration flow metering valve 518 with the return flow metering valve 522 and a line 542 connects the return flow metering valve 322 to a drain line 546 and to the hydraulic reservoir 502. A line 550 with a restrictive component connects the line 538 to the drain line 546. A line 554 connects the line 538 with a first port of the selective control valve 514. A line 558 connects the line 534 and the regeneration flow metering valve 318 with a second port of the selective control valve 514. A line 562 connects the line 538 with a third port of the selective control valve 514. The compensator 526 is connected to a high pressure line 566 through a line 570. A line 574 connects the rod end 494*a* of the hydraulic cylinder 494 to a fourth port of the selective control valve 514. A pressure sensor 578 is connected to the line 574 to sense a pressure of the rod end 494*a* of the hydraulic cylinder 494. A line 582 connects the cap end 494*b* of the hydraulic cylinder 494 to a fifth port of the selective control valve 514. A pressure sensor 586 is connected to the line 382 to sense a pressure of the cap end 494*b* of the hydraulic cylinder 494. A line 588 connects the compensator 526 to a relief valve 590.

FIG. 8 illustrates the flow of hydraulic fluid that occurs when the hydraulic cylinder 494 undergoes a regenerative mode change. The controller 530 commands the selective control valve 514 to shift to the position shown in FIG. 8. The controller 530 also senses a pressure of the rod end 494*a* and a pressure of the cap end 494*b* of the hydraulic cylinder 494. The controller 530 calculates a flow condition (e.g. pressure drop or flow rate) necessary to move the hydraulic cylinder 494 to the position commanded by the operator. The controller 530 determines a magnitude of the control signal to send to the respective solenoids of the regeneration flow metering valve 518 and the return flow metering valve 522. In this mode, the controller adjusts the pressure relief valve 590 to adjust flow through the compensator 526 to the line 534. The regeneration flow metering valve 518 may vary from 0-100% open as required and the return flow metering valve 522 is closed.

Specifically, as shown in FIG. 8, a force 594 due to a weight of a boom associated with the hydraulic cylinder 494 causes hydraulic fluid to flow out of the rod end 494a. This fluid travels through the line 574, through the selective control valve 514 to the lines 562 and 554. When the flow reaches the line 538, the regeneration flow metering valve 518 meters a first portion of the hydraulic fluid leaving the rod end 494a. The hydraulic fluid leaving the regeneration flow metering valve 518 travels through the line 534 to the line 558, where it is combined with fluid flowing from the high pressure line 566 through the compensator 526. The combined flow of hydraulic fluid flows through the selective control valve 514 into the line 582 and travels to the cap end 494b of the hydraulic cylinder 494 to produce the commanded motion. A second portion of hydraulic fluid flows from the line 538 to the line 550 and flows to the hydraulic reservoir 502. If the direction of the force 594 changes, the control system commands the return flow metering valve 522 to open and additionally adjusts the selective control valve 514.

In alternative constructions, the hydraulic circuits 290 and 490 may be used to control other hydraulic equipment such as a hydraulic motor operable to control, for example, the wrist adapter 50. For example, with reference to FIG. 8, the hydraulic cylinder 494 may be removed in favor of a hydraulic motor such that the hydraulic fluid inlet is connected to the line 582 and the hydraulic fluid outlet is connected to the line 574.

Various features and advantages of the disclosure are set forth in the following claims.

What is claimed is:

1. A hydraulic boom control circuit for a forestry machine, the boom including a hoist and a stick, the hydraulic boom control circuit comprising:
   a first hydraulic cylinder including a cap end and a rod end, the first hydraulic cylinder configured to actuate the hoist; and
   a second hydraulic cylinder including a cap end and a rod end, the second hydraulic cylinder configured to actuate the stick,
   wherein the circuit includes no more than two three-position spool valves, the spool valves in fluid communication with and operable to control the flow of fluid to and from the first and second hydraulic cylinders, and
   wherein the first hydraulic cylinder is independently controllable with respect to the second hydraulic cylinder,
   wherein the control circuit further includes a first hydraulic line configured to connect the first hydraulic cylinder to a first port of one of the no more than two three-position spool valves, and a second hydraulic line coupled to a second port of the one of the no more than two three-position spool valves, and
   wherein the second hydraulic line is in fluid communication with 1) a first variable control metering valve operable to feed a metered amount of hydraulic fluid to a reservoir and 2) a second variable control metering valve operable to feed a metered amount of hydraulic fluid to the first hydraulic cylinder.

2. The hydraulic boom control circuit of claim 1, wherein the circuit includes a high pressure side and a low pressure side, the hydraulic boom control circuit further comprising a hydraulic line configured to share a pressurized hydraulic fluid between the cap end of the first hydraulic cylinder and the cap end of the second hydraulic cylinder.

3. The hydraulic boom control circuit of claim 2, further comprising a circuit control valve operable to feed an amount of hydraulic fluid to and from one of the first hydraulic cylinder and the second hydraulic cylinder to the other of the first hydraulic cylinder and the second hydraulic cylinder.

4. The hydraulic boom control circuit of claim 3, further comprising a variable control metering valve operable to feed a metered amount of hydraulic fluid to a reservoir.

5. A hydraulic boom control circuit for a forestry machine, the boom including a hoist and a stick, the hydraulic boom control circuit comprising:
   a first hydraulic cylinder including a cap end and a rod end, the first hydraulic cylinder configured to actuate the hoist;
   a second hydraulic cylinder including a cap end and a rod end, the second hydraulic cylinder configured to actuate the stick; and
   a circuit control valve operable to feed an amount of hydraulic fluid to and from one of the first hydraulic cylinder and the second hydraulic cylinder to the other of the first hydraulic cylinder and the second hydraulic cylinder,
   wherein the circuit includes no more than two three-position spool valves, the spool valves in fluid communication with and operable to control the flow of fluid to and from the first and second hydraulic cylinders,
   wherein the first hydraulic cylinder is independently controllable with respect to the second hydraulic cylinder,
   wherein the circuit includes a high pressure side and a low pressure side, the hydraulic boom control circuit further comprising a hydraulic line configured to share a pressurized hydraulic fluid between the cap end of the first hydraulic cylinder and the cap end of the second hydraulic cylinder, and
   wherein the control circuit defines a path from the rod end of the first hydraulic cylinder, through one of the no more than two three-position spool valves, to the cap end of the first hydraulic cylinder.

6. The hydraulic boom control circuit of claim 5, wherein the control circuit defines a path from the rod end of the second hydraulic cylinder, through the other one of the no more than two three-position spool valves, to the cap end of the second hydraulic cylinder.

7. The hydraulic boom control circuit of claim 5, wherein the control circuit further includes a first hydraulic line configured to connect the first hydraulic cylinder to a first port of one of the no more than two three-position spool valves, and a second hydraulic line coupled to a second port of the one of the no more than two three-position spool valves, wherein the second hydraulic line is in fluid communication with 1) a first variable control metering valve operable to feed a metered amount of hydraulic fluid to a reservoir and 2) a second variable control metering valve operable to feed a metered amount of hydraulic fluid to the first hydraulic cylinder.

* * * * *